Figures 1, 2, 3, 4, 5, 6:
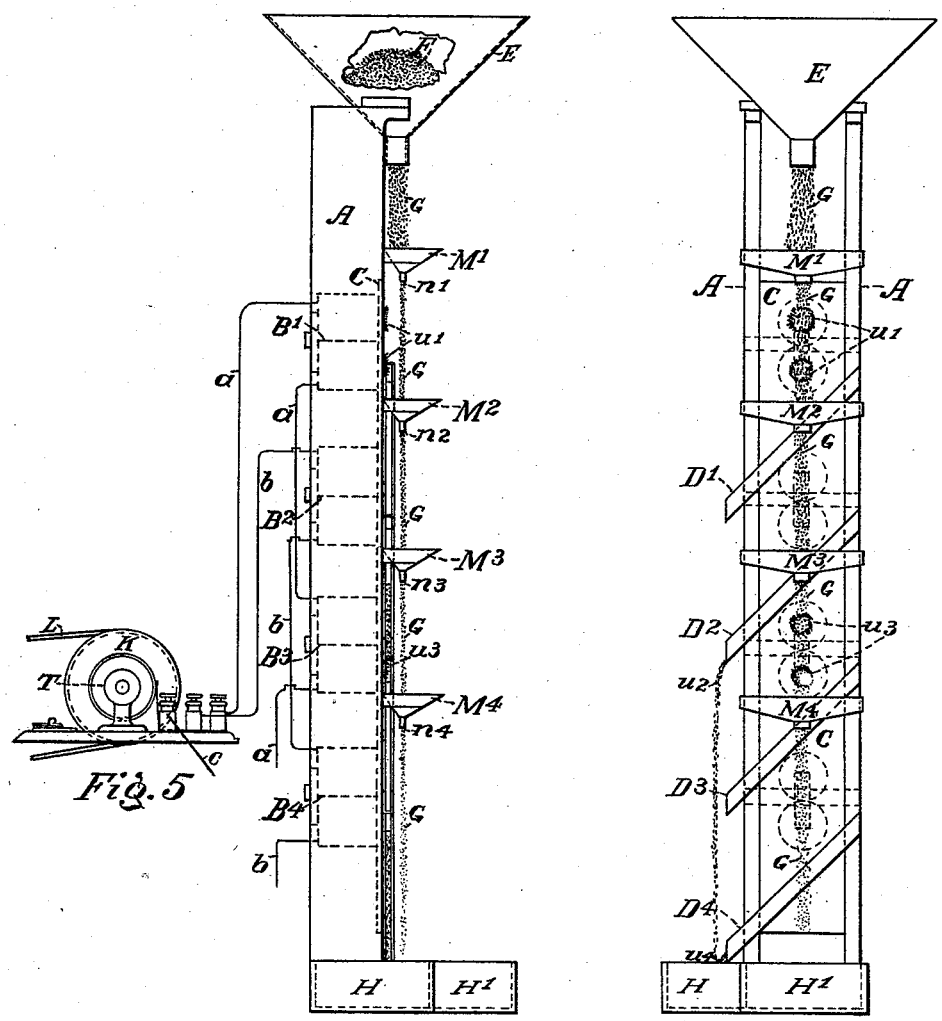

(No Model.) 3 Sheets—Sheet 1.

H. ARDEN.
MAGNETIC SEPARATOR.

No. 532,742. Patented Jan. 15, 1895.

Witnesses
Frank E. Adams
George W. Saum

Inventor
Henry Arden (No Model.)  3 Sheets—Sheet 2.

H. ARDEN.
MAGNETIC SEPARATOR.

No. 532,742. Patented Jan. 15, 1895.

Witnesses
Frank E. Adams
George W. Saun

Inventor
Henry Arden (No Model.) 3 Sheets—Sheet 3.
H. ARDEN.
MAGNETIC SEPARATOR.
No. 532,742. Patented Jan. 15, 1895.
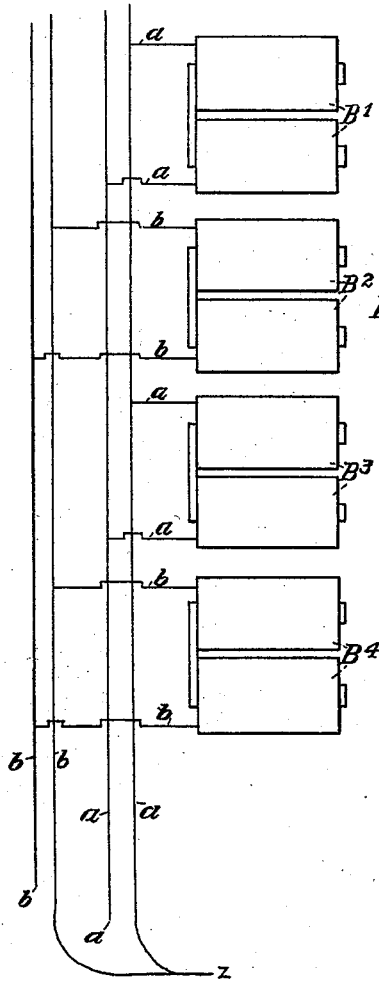
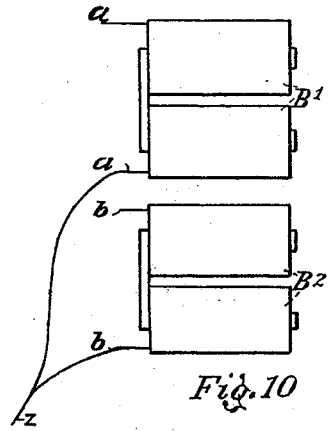
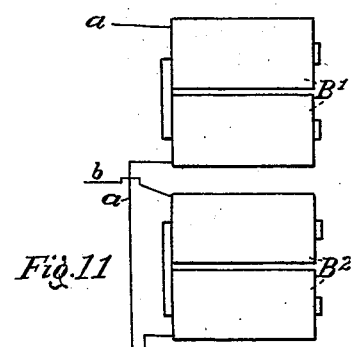
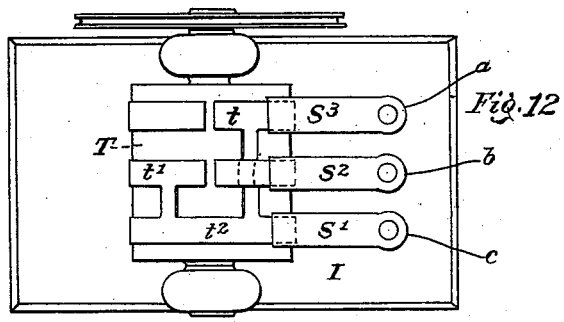
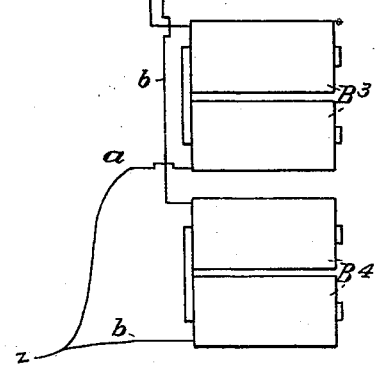
Witnesses
Frank E. Adams
Samuel G. Dunsnap.
Inventor
Henry Arden

UNITED STATES PATENT OFFICE.

HENRY ARDEN, OF SEATTLE, WASHINGTON.

MAGNETIC SEPARATOR.

SPECIFICATION forming part of Letters Patent No. 532,742, dated January 15, 1895.

Application filed August 15, 1894. Serial No. 520,340. (No model.)

*To all whom it may concern:*

Be it known that I, HENRY ARDEN, a citizen of the United States, residing at Seattle, in the county of King and State of Washington, have invented a new and useful Magnetic Separator, of which the following is a specification.

The object of my invention is to separate the iron contained in what is known as "black sand" from the non-magnetic matter contained in it. To accomplish this object I employ one or more electro-magnets so placed that when a stream of the black sand is dropped before the poles within the magnetic field the iron is attracted to the magnet and out of the line in which it is falling, while the other non-magnetic matter in the sand, not being affected by the attraction of the magnet, continues its descent. Beneath each magnet is a conduit or trough, open on top, which projects from the magnet any desired distance not greater than the distance between the magnet and the falling sand. Into this trough the iron drops from the magnet when the magnet is demagnetized, and the trough being inclined at a sufficient angle the iron runs away through it into any receptacle desired.

I will now explain how my invention is used when two electro magnets are employed. The magnets are placed either one below the other or one opposite the other or in any vertical plane so that the poles are sufficiently near to the falling sand to attract the iron to them. Under the poles of each magnet is placed the inclined open trough. A stream of the black sand falls from above before the poles of the magnets and within their magnetic fields. The magnets are alternately magnetized and demagnetized. The magnet first magnetized attracts to it the iron from the stream of sand falling before it and holds it until it is demagnetized, when the iron held by it falls beneath into the trough and runs away. The second magnet is magnetized either prior to or simultaneously with the demagnetization of the first, and attracts to it the iron from the falling sand and holds it until it is demagnetized and the first again magnetized, the iron falling from the second magnet into the trough beneath it and running away. This operation continues so long as the stream of sand falls, thus eliminating the iron from the non-magnetic matters contained in the sand, which non-magnetic matters fall into a suitable receptacle beneath. When the two magnets are not opposite to each other in the same horizontal plane it is necessary that the lower magnet remain magnetized for the period of time after the magnetization of the upper magnet which it takes the column of sand between the two magnets at the moment of magnetization of the upper magnet to fall before the lower magnet; otherwise the iron in this portion of the column will escape the action of the magnets. Another way of preventing this escape of the iron when the lowest magnet is demagnetized, is to place a third or supplemental magnet with its accompanying trough in the same horizontal plane as the lowest magnet, with its poles so that it will attract to it the iron in the falling sand and then magnetize and demagnetize said last two magnets so that at no time are they both demagnetized.

Where three magnets are used with their accompanying troughs they may be magnetized and demagnetized in rotation, or any one may be magnetized while the other two are demagnetized, or any two may be magnetized while the other is demagnetized; but the same remarks as above in relation to the lowest magnet are true if three as if two are used, unless of course the three are arranged so that the two lowest are opposite each other and are never both demagnetized at the same time. Indeed, the remarks above regarding the lowest magnet are true whatever number of magnets be used, and it may be said that, whenever the lowest magnet is in a horizontal plane below the other magnets, it must remain magnetized after the magnetization of the magnet above it until the iron which would otherwise escape as above explained has been attracted to it.

When four or more magnets are used the operation will be as hereinafter described.

Figure 7:
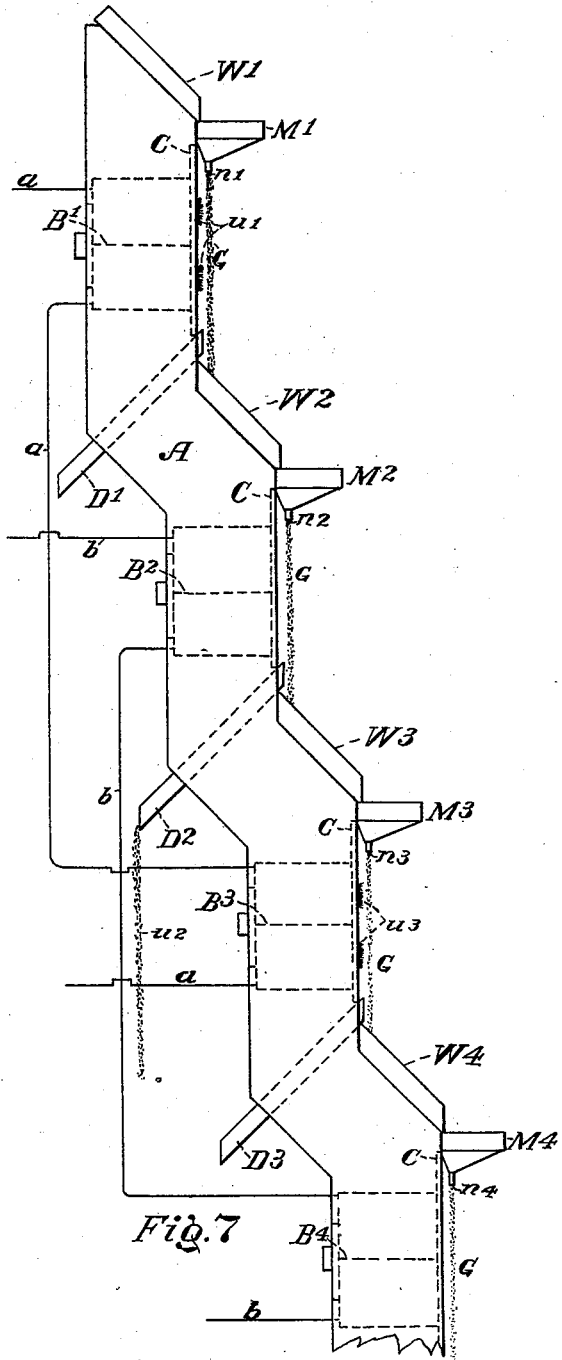
Figure 8:
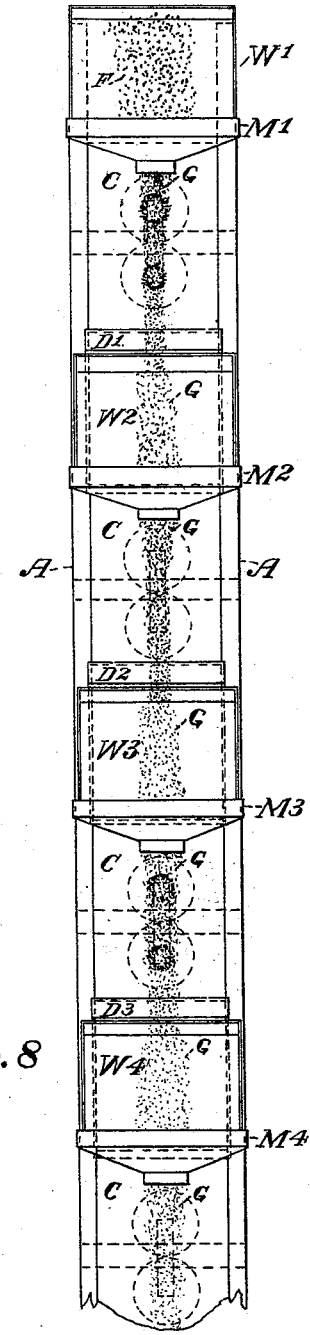

In the accompanying drawings Figure 1, is a front elevation of a machine using four magnets. Fig. 2, is a side elevation of the same. Fig. 3, is a plan view of the same. Fig. 4, is a plan view of a commutator or switch. Fig. 5, is a side elevation of the commutator or switch. Fig. 6, is a plan view of a modified form of electro-magnet. Fig. 7, is a side elevation of another form of my machine. Fig. 8, is a front elevation of same. Figs. 9, 10 and 11 show three distinct sets of magnets with their electrical connections. Fig. 12 is another plan view of the commutator. In these last four figures the connection between $a$ on the commutator and $a$ on the magnets is not shown. Neither is the connection shown between $b$ on the commutator and $b$ on the magnets. $c$ is one conductor to the dynamo and $z$ the other conductor thereto.

Similar letters refer to similar parts throughout the several views.

A, is the framework to which the magnets $B'$, $B^2$, $B^3$, $B^4$, are fastened.

C, is a thin sheet of paper, copper or other substance, preferably non-magnetic in front of the poles of the magnets and fastened thereto or to the frame A.

$D'$, $D^2$, $D^3$, $D^4$, are the inclined troughs under the magnets.

E, is the hopper from which the black sand is fed. F, is the black sand in this hopper.

G, is the falling stream of sand.

H, is a receptacle to catch the iron from the troughs.

H', is a receptacle to receive the column of sand after the iron has been eliminated from it.

$a$, $b$, $c$, are conductors of the electricity.

T, is the switch or commutator upon the frame I.

J, is another switch for opening and closing the circuit through the commutator and magnets.

K, is the driving pulley attached to the commutator to which motion is communicated from any motor through the belt L.

$M'$, $M^2$, $M^3$, $M^4$, are small hoppers to catch the stream G, between the magnets in its descent, and concentrate the feed. $n'$, $n^2$, $n^3$, $n^4$, are openings in these hoppers and can be adjusted to any feed by pressing them together or expanding them.

$t^2$ is the portion of the commutator circuit always unbroken.

$t'$ and $t$ are portions of the commutator circuit broken.

$S'$, $S^2$, $S^3$, are brushes resting on $t^2$, $t'$, and $t$, respectively.

$u'$, $u^3$ is iron held by the magnets $B'$, $B^3$, respectively while vitalized.

$u^2$, $u^4$, is iron which has dropped from the magnets $B^2$, $B^4$, respectively when they were devitalized.

In Fig. 6, O, and P are the coils and $g$, and $h$, the poles of an electro magnet having a straight core.

In Figs. 7 and 8, $W'$, $W^2$, $W^3$, $W^4$, are inclined planes down which the stream of sand G rolls.

I will now proceed to describe the operation of my machine when four electro magnets are used as shown in the drawings The commutator H, is set in motion at a suitable speed. This speed must not be so fast that the time between the magnetizing and demagnetizing of the magnets is so small that the iron $u'$, $u^2$, $u^3$, $u^4$, has not time to drop from the magnets into the troughs $D'$, $D^2$, $D^3$, $D^4$; neither must the time be so slow that too much iron $u'$, $u^2$, $u^3$, $u^4$, will accumulate on the magnets and drop over the outer edge of the troughs $D'$, $D^2$, $D^3$, $D^4$. The commutator H, being at a suitable motion, the switch J, is turned on so as to close the circuit through the commutator to the magnets, the current passing alternately through the circuit $c$, $s'$, $t^2$, $t$, $s^3$, and $a$, thereby magnetizing the magnets $B'$, $B^3$, and then through the circuit $c$, $s'$, $t^2$, $t'$, $s^2$ and $b$, thereby magnetizing the magnets $B^2$ $B^4$. The stream of sand G, from the hopper E is then caused to flow into the hopper $M'$, (the amount of the flow being regulated to the capacity of the machine by the size of the feed in hopper E,) thence through the opening $n'$, whence it drops before the poles of the magnet $B'$, at a distance therefrom greater than the outer edge of the trough $D'$; thence that portion of the stream G, not attracted by the magnet $B'$ passes into the hopper $M^2$, and through the opening $n^2$, whence it drops before the poles of the magnet $D^2$ at a distance therefrom greater than the outer edge of the trough $D^2$; thence that portion of the stream G not previously attracted by magnets $B'$, $B^2$ passes into the hopper $M^3$, and through the opening $n^3$, whence it drops before the poles of the magnet $B^3$, at a distance therefrom greater than the outer edge of the trough $D^3$; thence that portion of the stream G, not previously attracted by the magnets $B'$, $B^2$, $B^3$, passes into the hopper $M^4$, and through the opening $n^4$, whence it drops before the poles of the magnet $B^4$ at a distance therefrom greater than the outer edge of the trough $D^4$, and thence into the receptacle H'. The commutator shown in the drawings magnetizes each magnet during a half of its revolution, the conductors $t$ and $t'$ breaking their several connections with the brushes $S^2$ and $S^3$ at suitable places, but the connection of brush $S^2$ with $t'$ should not cease until after the circuit $S^3$ with $t$ is formed, for the reason hereinbefore explained. The iron $u'$, and $u^3$ collected by the magnets $B'$ and $B^3$ respectively while they are magnetized drops when they are demagnetized into the troughs $D'$ $D^3$ respectively and the iron $u^2$, $u^4$, collected by the magnets $B^2$, $B^4$ respectively while they are magnetized, drops when they are demagnetized into the troughs $D^2$, $D^4$, respectively.

Figs. 7 and 8, show a modification of my invention. In this modification the sand instead of falling in a vertical stream passes over inclined planes $W'$, $W^2$, $W^3$, $W^4$, from thence into the hoppers $M'$, $M^2$, $M^3$, $M^4$, thence through the openings $n'$, $n^2$, $n^3$, $n^4$, in a vertical drop before the magnets. In other words the stream after leaving the hopper E, passes over the inclined plane $W'$; thence into the hopper M1'; thence in a drop before the poles of the magnet B′, which extracts a portion of the iron $u'$; thence to the inclined plane W² to the hopper M²; thence through same in a drop before the poles of magnet B², which extracts a portion of the iron and so on.

Any number of magnets necessary to extract the iron may be used.

There are so many arrangements of the magnets which may be used when the stream of sand falls vertically that it is impracticable to describe them all. Thus the magnets can be arranged in vertical planes opposite to each other, the stream of sand being between them; or they can be arranged in vertical planes forming a prism, the stream of sand being between them, or they can be arranged in vertical planes forming a quadrilateral, or a hexagon, and so on.

Fig. 6 is a plan view of an electro-magnet which permits of still other forms of construction of my machine. Its core is a straight bar. By the use of this magnet half the poles of the magnets used face on one side of the frame A, and half on the other. In this form there are, of course, double the number of magnets required, but they give two machines, one on each side of the frame and two streams of sand can be operated at the same time, one on each side of the machine.

I have found that with some sand it is impracticable to extract quite all of the iron without the use of the intermediate hoppers M′, M², M³, M⁴. The stream spreads in falling and it is the function of these hoppers to catch and readjust the feed of the stream. It is not, however, in all cases necessary that there should be one of these hoppers between each magnet and indeed without their use most of the iron can be extracted.

I do not claim as my invention the form of hopper shown in the drawings nor any particular form of hopper, as almost any ordinary hopper will subserve my purpose.

I prefer to use one current to magnetize the magnets, and switch from one magnet to another, or from one set of magnets to another, as before explained by means of a switch or commutator. I can of course use the pendulum of a clock for this purpose, or any suitable clockwork actuated by a spring. I can also employ separate currents for each magnet or series of magnets simply making and breaking each circuit separately.

What I claim as my invention, and desire to secure by Letters Patent, is—

1. In a magnetic separator, the electro magnets B′, B² whose poles form a magnetic field within which a stream of sand falls, troughs D′, D², without the line of fall of said sand conductors $c, a$ and $c, b$ over which electricity passes when circuits are closed, and the commutator T, substantially as described.

2. In a magnetic separator, the electro magnets B′, B² whose poles form a magnetic field within which a stream of sand falls, troughs D′, D², without the line of fall of the sand, conductors $c, a$ and $c, b$, over which electricity passes when circuits are closed, commutator T, together with one or more hoppers M′, M² substantially as described.

3. In a magnetic separator, the electro magnets B′, B² in different horizontal planes whose poles form a magnetic field within which a stream of sand falls troughs D′, D² without the line of fall of the sand, conductors $c, a$, and $c, b$, over which electricity passes when circuits are closed, and commutator T, in combination with a supplemental magnet in the same horizontal plane as the lower magnet magnetized when said lower magnet is demagnetized, substantially as described.

4. In a magnetic separator the magnets B′, B², B³, B⁴ whose poles form a magnet field within which a stream of sand falls, in combination with troughs D′, D², D³, D⁴, without the line of fall of the sand conductors $c, a$, and $c\ b$ over which electricity passes when the respective circuits are closed, and the commutator T, substantially as described.

5. In a magnetic separator any number of electro magnets B′, B², whose poles form a magnetic field within which a stream of black sand falls having troughs D′, D², within the line of fall of the sand in combination with the stream G, conductors over which electricity passes to the magnets when the circuits are closed, and one or more commutators or switches actuated by power or hand for shifting the current from one magnet to another or from one series of magnets to another substantially as described.

6. In a magnetic separator, the combination of any number of electro magnets B′, B², whose poles form a magnetic field, within which a stream of black sand G falls, the troughs D′ D², without the line of fall of the sand, conductors over which electricity passes to the magnets when the circuits are closed, the commutator or switch T, and the hoppers M′, M², substantially as described.

7. In a magnetic separator the combination of the hopper M′, outlet $n'$, through which may fall a stream of sand G and magnet B′ with trough D′, said magnet being alternately magnetized and demagnetized by a current of electricity being passed through and shut off from same substantially as described.

HENRY ARDEN.

Witnesses:
WILLIAM X. RUSSELL,
HENRY J. MANN.